US008824850B2

(12) United States Patent
Garcia et al.

(10) Patent No.: US 8,824,850 B2
(45) Date of Patent: Sep. 2, 2014

(54) INSECT-INFESTATION PREVENTION DEVICE FOR A TELECOMMUNICATIONS EQUIPMENT HOUSING

(75) Inventors: Gustavo Garcia, Chihuahua (MX); Timothy G. Badar, St. Paul, MN (US); Juan Munoz, Juarez (MX); Erik Gronvall, Bloomington, MN (US); Marcelo Enrique Ruiz, Juarez (MX); Scott C. Sievers, Jordan, MN (US); Clair Iburg, Rosemount, MN (US); Kristofer Bolster, Jordan, MN (US); John Pfarr, Le Sueur, MN (US)

(73) Assignee: ADC Telecommunications, Inc., Berwyn, PA (US)

( * ) Notice: Subject to any disclaimer, the term of this patent is extended or adjusted under 35 U.S.C. 154(b) by 201 days.

(21) Appl. No.: 13/010,519

(22) Filed: Jan. 20, 2011

(65) Prior Publication Data

US 2011/0182558 A1 Jul. 28, 2011

Related U.S. Application Data

(60) Provisional application No. 61/298,432, filed on Jan. 26, 2010.

(51) Int. Cl.
*G02B 6/46* (2006.01)
*G02B 6/38* (2006.01)

(52) U.S. Cl.
CPC .................................... *G02B 6/3887* (2013.01)
USPC ............ 385/135; 385/134; 385/137; 385/138

(58) Field of Classification Search
None
See application file for complete search history.

(56) References Cited

U.S. PATENT DOCUMENTS 5,146,532 A 9/1992 Hodge
6,259,851 B1 * 7/2001 Daoud .......................... 385/135
6,363,198 B1 3/2002 Braga et al.

(Continued)

FOREIGN PATENT DOCUMENTS

DE 20 2006 006 016 U1 8/2006
JP 01317824 A * 12/1989 ............... B60H 1/26

OTHER PUBLICATIONS

International Search Report and Written Opinion mailed Apr. 4, 2011.

*Primary Examiner* — Mark Robinson
*Assistant Examiner* — Andrew Jordan
(74) *Attorney, Agent, or Firm* — Merchant & Gould P.C.

(57) ABSTRACT

An insect-infestation prevention device and a fiber optic telecommunications equipment including an insect-infestation prevention device is disclosed. The fiber optic telecommunications equipment includes a housing with a main housing portion defining a first transverse wall, a front wall, a rear wall, a top wall, and a bottom wall, cooperatively defining an interior. A cable exit/entry is provided opening on one of the front wall, the rear wall, the top wall, and the bottom wall. A removable insect-infestation prevention device is located adjacent the cable exit/entry opening, the insect-infestation prevention device including cable openings communicating with the cable exit/entry opening. The cable openings of the device are sized to accommodate fiber optic cables exiting or entering the housing while limiting the amount of free space around the fiber optic cables to prevent insects from entering the housing. A removable cover mounted to the main housing portion defines a second transverse wall of the housing and captures the insect-infestation prevention device against the main housing portion.

7 Claims, 20 Drawing Sheets

124 116 118 108 110 126 112 114 130 106 120

(56) References Cited

U.S. PATENT DOCUMENTS

| | | | | |
|---|---|---|---|---|
| 7,035,510 | B2 * | 4/2006 | Zimmel et al. | 385/100 |
| 7,349,616 | B1 * | 3/2008 | Castonguay et al. | 385/135 |
| 7,418,181 | B2 | 8/2008 | Zimmel et al. | |
| 7,418,186 | B1 | 8/2008 | Grubish et al. | |
| 7,499,622 | B2 * | 3/2009 | Castonguay et al. | 385/135 |
| 7,748,911 | B2 * | 7/2010 | Keenum et al. | 385/76 |
| 8,081,857 | B2 | 12/2011 | Nair et al. | |
| 8,380,036 | B2 * | 2/2013 | Smith | 385/136 |
| 2002/0131750 | A1 | 9/2002 | Holman et al. | |
| 2006/0153516 | A1 * | 7/2006 | Napiorkowski et al. | 385/135 |
| 2006/0188210 | A1 | 8/2006 | Zimmel | |
| 2006/0233508 | A1 * | 10/2006 | Mann et al. | 385/135 |
| 2006/0269198 | A1 * | 11/2006 | Blazer et al. | 385/100 |
| 2007/0189692 | A1 * | 8/2007 | Zimmel et al. | 385/135 |
| 2008/0124039 | A1 | 5/2008 | Gniadek et al. | |
| 2008/0253730 | A1 * | 10/2008 | Cox et al. | 385/138 |
| 2008/0317415 | A1 * | 12/2008 | Hendrickson et al. | 385/77 |
| 2009/0022469 | A1 | 1/2009 | Zimmel | |
| 2011/0164853 | A1 * | 7/2011 | Corbille et al. | 385/135 |
| 2011/0182558 | A1 * | 7/2011 | Garcia et al. | 385/135 |
| 2013/0077928 | A1 * | 3/2013 | Hsing | 385/135 |

* cited by examiner

FIG. 14
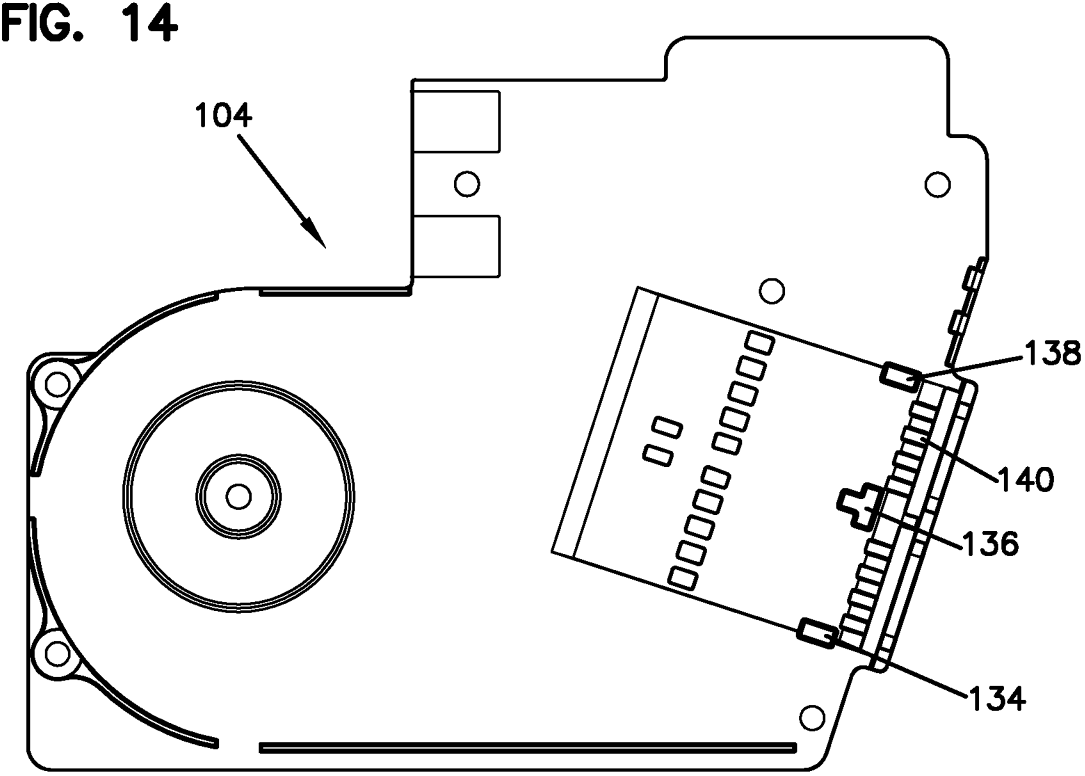
FIG. 15
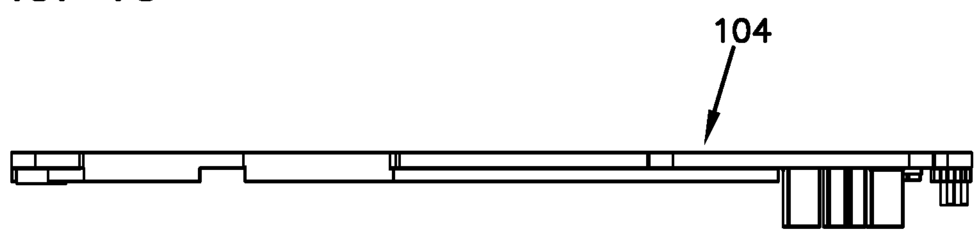
FIG. 16
104

400
406
408
404
404

600 602 602 604 606

INSECT-INFESTATION PREVENTION DEVICE FOR A TELECOMMUNICATIONS EQUIPMENT HOUSING

CROSS REFERENCE TO RELATED APPLICATION

This application claims the benefit of U.S. Provisional Patent Application Ser. No. 61/298,432, filed Jan. 26, 2010, which application is hereby incorporated by reference in its entirety.

FIELD

The present disclosure generally relates to fiber optic telecommunications equipment. More specifically, the present invention relates to fiber optic modules and devices for preventing unwanted insects from entering the modules.

BACKGROUND

In fiber optic telecommunications, insect-infestation can be a significant problem, especially for those types of equipment that are located in outdoor environments. In fiber optic connectivity, out of service conditions have been a result of insect-induced fiber breakage. Insects such as ants are able to enter telecommunications equipment through larger openings such as cable entry/exit points of the equipment and damage the optical fiber within the equipment. For example, in telecommunications equipment such as modules housing optical splitters, in order to accommodate a large number of split signal cables exiting the modules for subscriber connectivity, large exit openings are provided. Even when the maximum splitting capacity of a given splitter (e.g., a 1×32) is used, there might be ample room left around the exiting cables for allowing ants to enter the module.

It is desirable to find cost-effective solutions to these types of insect-infestation problems.

SUMMARY

The present disclosure relates to an insect-infestation prevention device for telecommunications equipment and telecommunications equipment including an insect-infestation prevention device.

According to one example embodiment of the present disclosure, the insect-infestation prevention device is designed to prevent entry of insects into a fiber optic telecommunications equipment through a fiber optic cable entry/exit opening provided on the equipment.

According to another aspect of the disclosure, the insect-infestation prevention device includes a device configured to limit the amount of space remaining around cables exiting/entering through an opening in a piece of telecommunications equipment.

According to another aspect of the disclosure, the insect-infestation prevention device includes a removably-mounted device configured to limit the amount of space remaining around cables exiting/entering through an opening in a piece of telecommunications equipment.

According to another aspect of the disclosure, the insect-infestation prevention device includes a device in the form of a cable manager or an optical fiber bend-limiting apparatus configured to limit the amount of space remaining around cables exiting/entering through an opening in a piece of telecommunications equipment.

According to another aspect of the disclosure, the insect-infestation device includes a removably-mounted device in the form of a cable manager or a bend-limiting apparatus configured to guide split fiber optic cables out of an opening provided in a fiber optic splitter module, wherein the insect-infestation device is configured to limit the amount of space remaining around the cables exiting the cable opening.

BRIEF DESCRIPTION OF THE DRAWINGS

The accompanying drawings, which are incorporated in and constitute a part of the description, illustrate several aspects of the disclosure and together with the detailed description, serve to explain the principles of the disclosure. A brief description of the drawings is as follows:

FIG. 14 is a left side elevational view of the cover of FIG. 13;

FIG. 15 is a top plan view of the cover of FIG. 13;

FIG. 16 is a bottom plan view of the cover of FIG. 13;

DETAILED DESCRIPTION

Reference will now be made in detail to exemplary aspects of the present invention which are illustrated in the accompanying drawings. Wherever possible, the same reference numbers will be used throughout the drawings to refer to the same or similar parts.

The present disclosure generally relates to fiber optic telecommunications equipment including devices for preventing unwanted insects from entering the equipment. In fiber optic telecommunications, insect-infestation can be a significant problem, especially for those types of equipment that are located in outdoor environments. Insects such as ants (e.g., carpenter ants, wood ants, etc.) can enter telecommunications equipment through openings such as cable entry/exit points of the equipment and damage cabling and optical fiber within the equipment. For example, in telecommunications equipment such as modules housing fiber optic splitters, ants can enter the modules through openings configured for exiting split signal cables.

Figure 1:
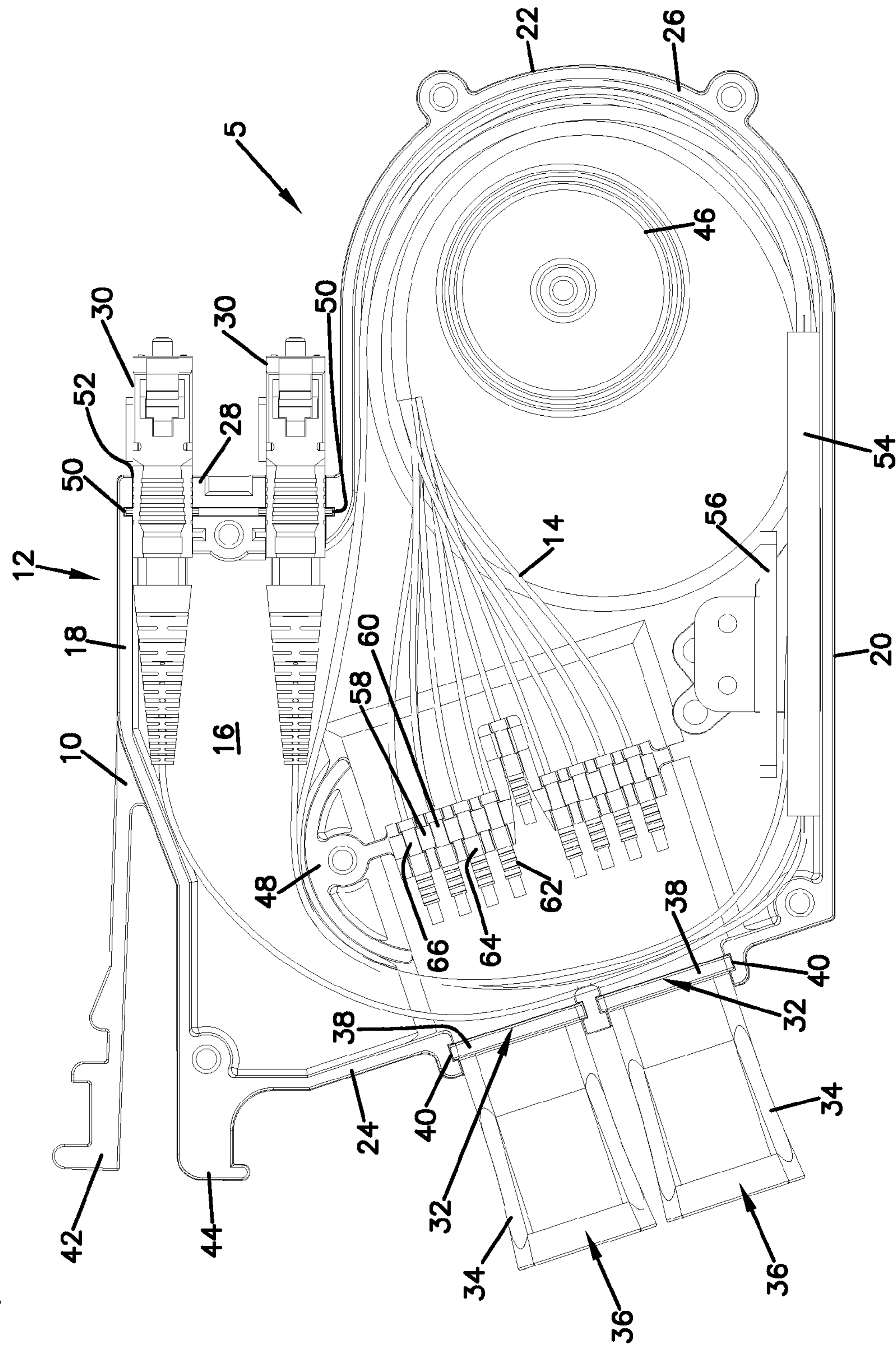
FIG. 1 is a right side view of a main housing portion of a prior art fiber optic splitter module, the fiber optic splitter module shown without a cover exposing the interior features of the fiber optic splitter module including an example routing of a fiber optic cable within the fiber optic splitter module.

FIG. 1 illustrates the main housing portion 10 of the housing 12 of a prior art fiber optic splitter module 5. The cover of the fiber optic splitter module housing 12 has been removed, exposing the interior features of the fiber optic splitter module including an example routing of a fiber optic cable 14 within the fiber optic splitter module.

The main housing portion 10 includes a first transverse sidewall 16 extending between a top wall 18, a bottom wall 20, a rear wall 22, and a front wall 24. As noted above, the open side of module main housing 10 is normally closed by a removable cover that defines a second transverse sidewall.

Rear wall 22 of main housing portion 10 includes a curved portion 26 configured to provide bend radius protection to cables within the interior. Rear wall 22 of main housing portion 10 also includes an inset portion 28. A pair of fiber optic connectors 30 positioned at inset portion 28 protrude rearwardly from rear wall 22 for mating with fiber optic adapters provided on other telecommunications equipment for providing input signals.

The front wall 24 of module main housing 10 is angled, which may aid in the direction of cables exiting module 5 toward a desired location. The depicted module 5 includes two cable exit openings 32. The module 5 includes bend limiting apparatuses 34 extending from front wall 24 of module main housing 10 at the cable exit openings 32. Each bend limiting apparatus 34 may also be referred to as a boot. Each boot 34 defines a central opening 36 aligned with a cable exit opening 32 for routing cables 14 out of the module 5. The boots 34 are slidably mounted to main housing portion 10 and are configured to be captured by the cover of module 5 when cover is mounted to main housing portion 10.

The boots 34 define a protruding rear lip 38 that is slidably inserted into slots 40 defined around the cable exit openings 32. The boots 34 permit telecommunications cables 14 within module 5 to be directed outside of module 5 while providing bend radius protection to the fiber optic cables 14. The boots 34 are sized thin enough to fit within the profile of the fiber optic splitter module 5.

Since the fiber optic splitter module 5 is a removable piece of equipment, the main housing 10 includes an integrally formed flexible latch 42 (i.e., cantilever arm) that is adapted to engage a portion of a telecommunications equipment to hold module 5 within the equipment. Flexible latch 42 also deflects to permit withdrawal of module 5 from the equipment. The module 5 includes a fixed grip tab 44 opposing and adjacent to flexible latch 42 to aid removal of module 5 from the telecommunications equipment.

Within interior of main housing 10, splitter module 5 includes a first radius limiter 46 adjacent curved portion 26 of rear wall 22 of main housing 10. Splitter module 5 includes a second radius limiter 48 adjacent front wall 24 of main housing 10 near the boots 34. Connectors 30 of splitter module 5 are slidably inserted into opposing slots 50 formed in apertures 52 at the rear wall 22 and project out from rear wall 22 at inset portion 28.

Adjacent bottom wall 20 of main housing 10 within interior is an optical component in the form of a fiber optic splitter 54. The splitter 54 is held against the interior of bottom wall 20 by a clamp 56 (i.e., bracket). Clamp 56 may be mounted to the splitter module main housing 10 with fasteners.

Splitter module main housing 10 includes integrally formed crimp holders 58, forming slots 60, adjacent front wall 24 of main housing 10 underneath second radius limiter 48. Crimp elements 62 crimped to the ends of cables 14 that are split by the fiber optic splitter 54 are slidably received into crimp holders 58. Crimp elements 62 define square flanges 64 between which is defined a recessed portion 66. The slots 60 defined by the crimp holders 58 include complementary structure to the crimp elements 62 such that once the crimp elements 62 are slidably inserted into the slots 60, the crimp elements 62 are prevented from moving in a longitudinal direction due to the flanges 64. In the embodiment shown, there are nine crimp holding slots 60, each one being able to accommodate up to four crimp elements 62. The crimp holders 58 are configured to arrange the split signal cables to align with the boot central openings 36. As such, the cables 14, after being routed through the crimp holders 58, can exit the module 5 for further service connectivity.

Further details of the fiber optic splitter module 5 shown in FIG. 1 are described in U.S. Pat. No. 7,418,181, the entire disclosure of which is incorporated herein by reference.

In the particular module 5 shown in FIG. 1 and described above, the cable exit openings 32 surrounded by the boots 34 provide a problem area for entry of insects into the module 5. Even if a 1×32 fiber optic splitter 54 is used in the module 5 and each boot 34 receives sixteen fiber optic cables 14 for exiting, there might be room left around the exiting cables 14 for allowing insects to enter the module 5.

As will be described below, according to one aspect, the disclosure relates to an insect-infestation prevention device that is configured to limit the amount of space remaining around cables exiting the cable openings through the bend limiting boots. According to another aspect, the insect-infestation prevention device includes a removably-mounted device that can be used as a retrofit measure with an existing piece of telecommunications equipment such as the fiber optic module 5 described above and shown in FIG. 1, without affecting the assembly, performance, and density of the module 5. As will be described below, according to another aspect of the disclosure, the insect-infestation prevention device is in the form of a cable manager configured to guide cables going from the crimp holders 58 to the boots 34, wherein the cable manager can be used with an existing fiber optic splitter module such as the module 5 described above and shown in FIG. 1. According to another aspect of the disclosure, the insect-infestation prevention device includes a device that is formed as part of the bend limiting boot itself, which can be used with an existing fiber optic splitter module such as the module 5 described above and shown in FIG. 1.

The inventive insect-infestation devices and the telecommunications equipment including such devices are described and illustrated herein with reference to a fiber optic splitter module. It should be noted that the example fiber optic splitter module depicted is simply one piece of telecommunications equipment used to describe and show the inventive features of the insect-infestation devices of the present disclosure and that the inventive aspects described herein may be used on or adapted to other equipment.

Figure 2:
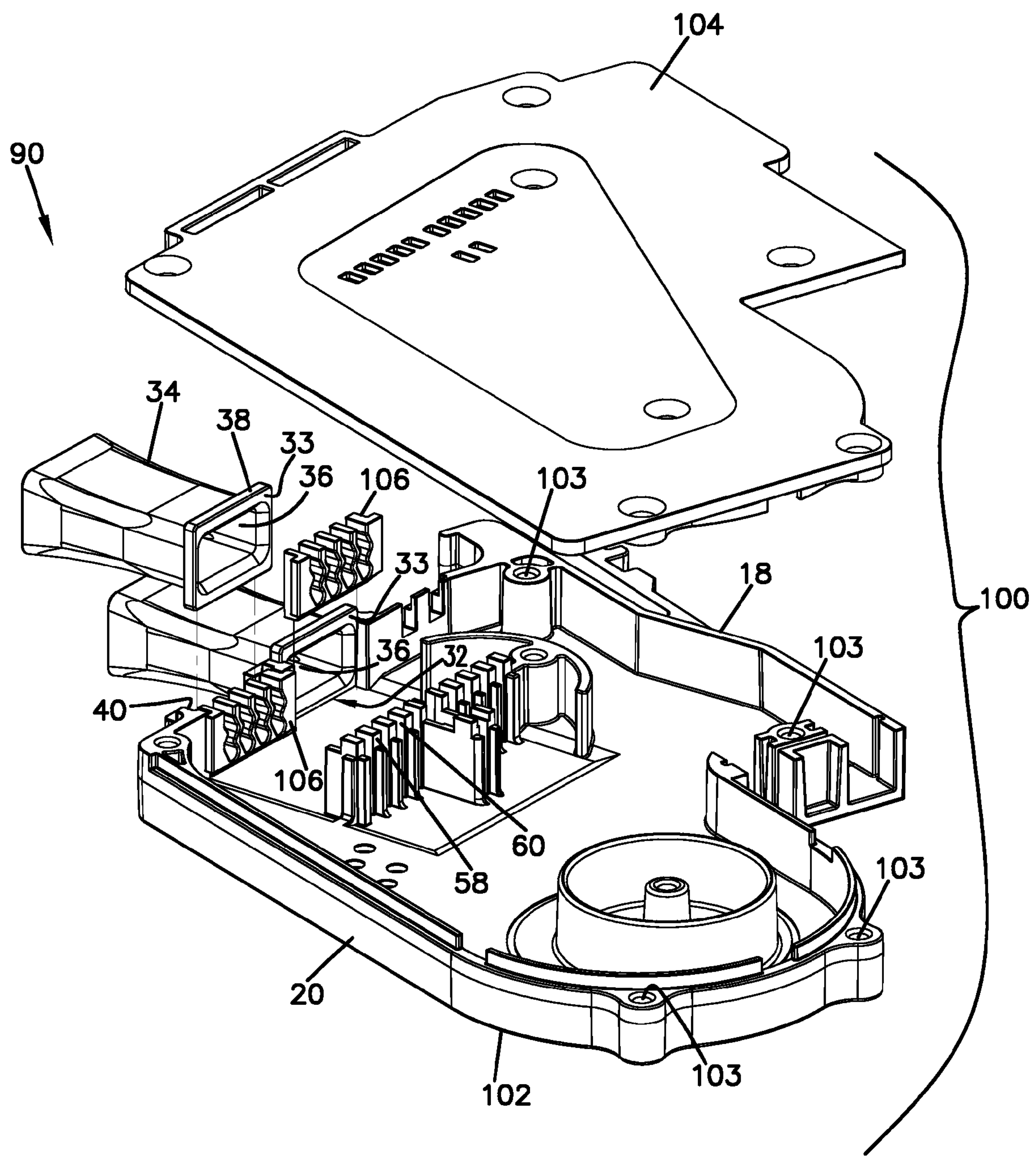
FIG. 2 is an exploded rear perspective view of a fiber optic splitter module housing including features having examples of inventive aspects in accordance with the present disclosure.
Figure 3:
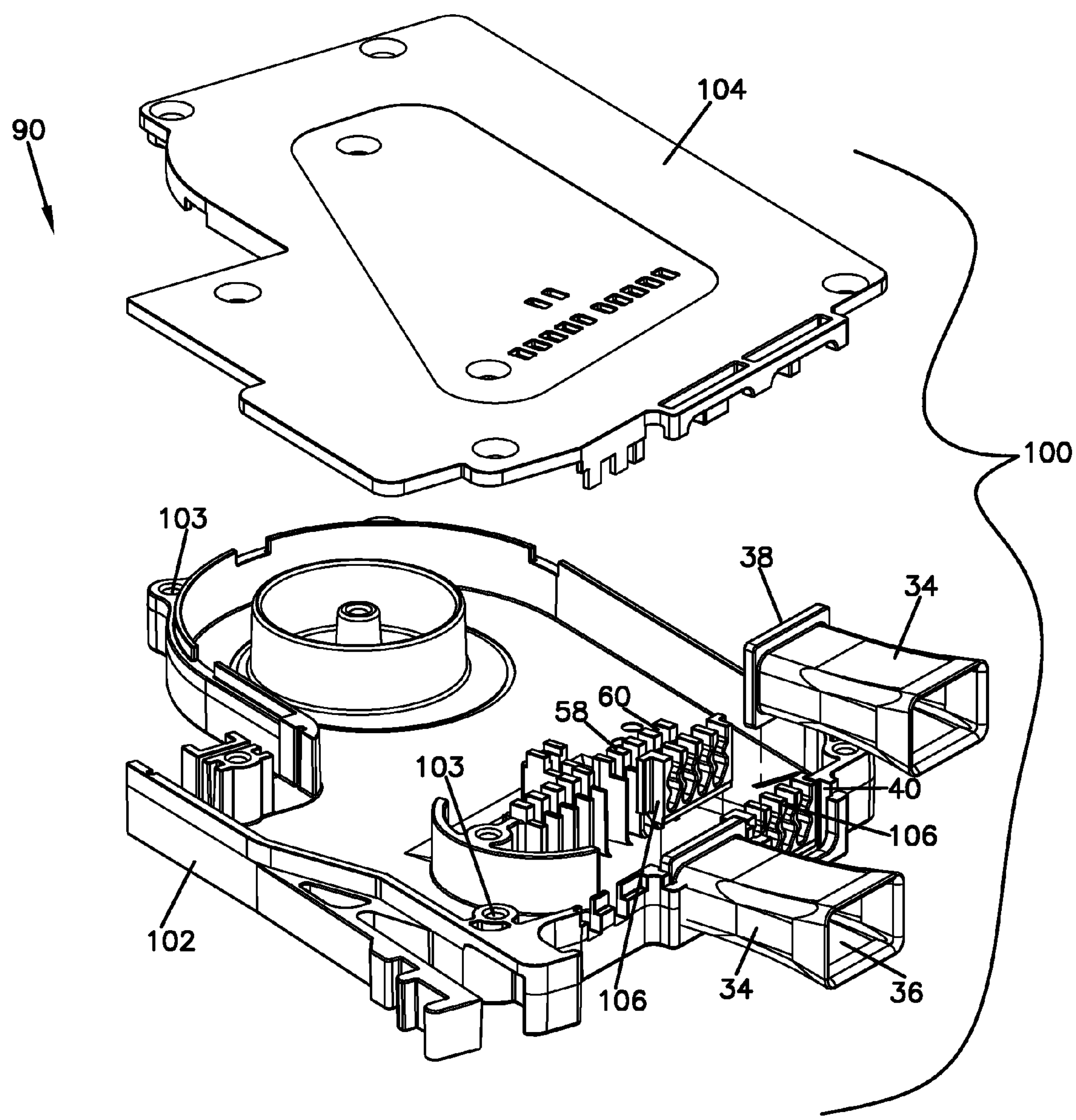
FIG. 3 is an exploded front perspective view of the fiber optic splitter module housing of FIG. 2.
Figure 4:
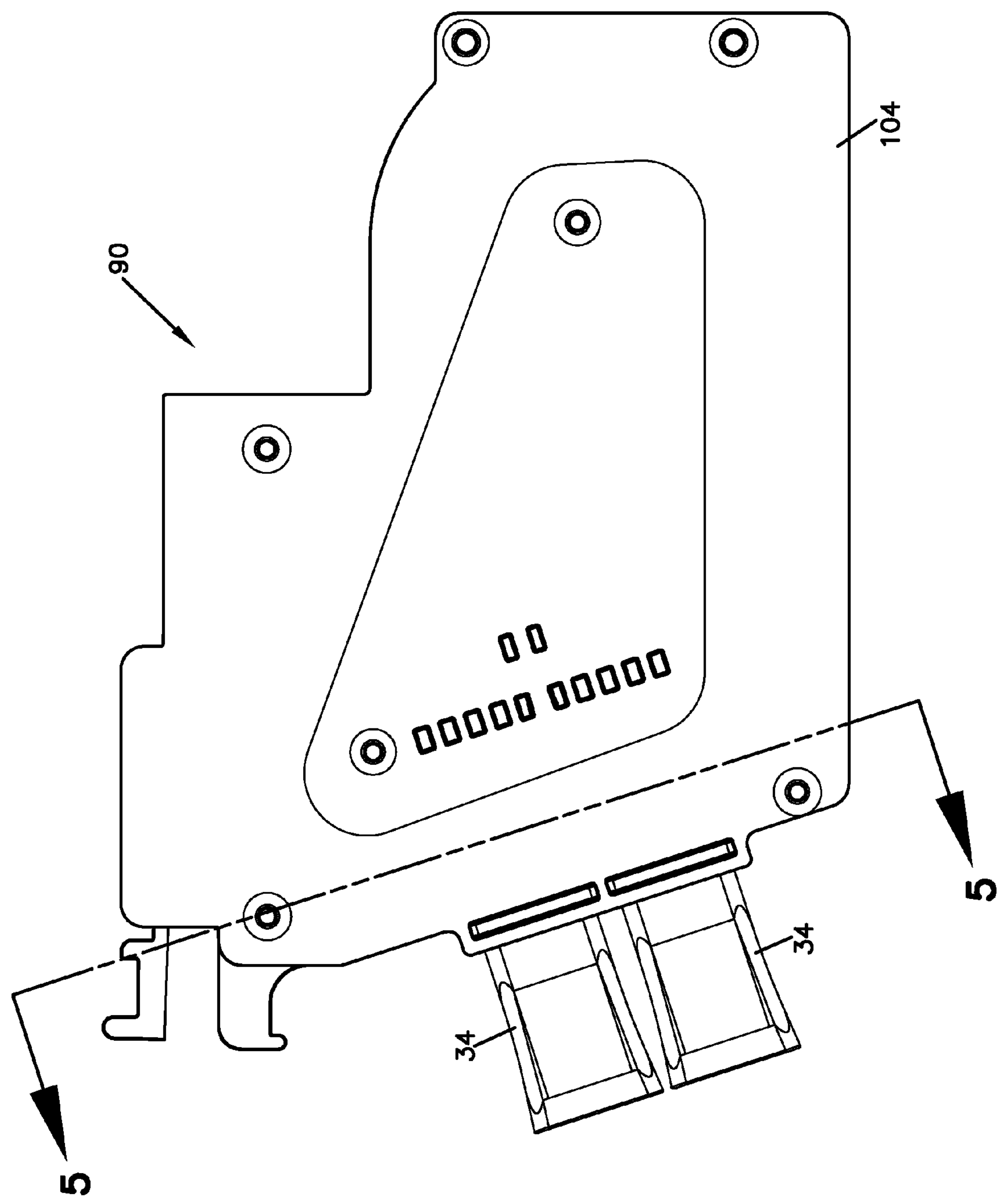
FIG. 4 is a right side view of the fiber optic splitter module housing of FIG. 2 in an assembled configuration.

Referring now to FIGS. 2-4, a fiber optic splitter module housing 100 of a fiber optic splitter module 90 including features having examples of inventive aspects in accordance with the present disclosure is illustrated. The fiber optic splitter module housing 100 shown in FIGS. 2-4 includes a main housing portion 102 having features similar to those of the fiber optic splitter module 5 shown in FIG. 1. However, as will be described herein in further detail, the fiber optic splitter module 90 includes insect-infestation prevention aspects. The fiber optic splitter module 90 also includes a novel cover 104 designed to accommodate the insect-infestation prevention features.

According to one example embodiment, the fiber optic splitter module 90 includes at least one insect-infestation prevention device 106 in the form of a cable manager configured to guide cables from the crimp holders 58 to the boots 34. The cover 104 of the module 90 includes structure for capturing the cable manager 106 within the main housing portion 102 of the fiber optic splitter module housing 100 as will be described in further detail.

The insect-infestation prevention device 106 provided in the form of a cable manager is shown in FIGS. 6-12. The cable managers 106 are configured to be mounted adjacent the front cable exit openings 32 of the main housing portion 102, aligning with the boot central openings 36.

As shown, the cable manager device 106 includes a one-piece molded body 108 defining a top end 110, a bottom end 112, a front end 114, a rear end 116, a right side 118 and a left side 120. The body 108 includes cutouts 122 extending from the right side 118 toward the left side 120. The cutouts 122 are configured to receive fiber optic cables in a direction from the right side 118 toward the left side 120. In the depicted embodiment, the cutouts 122 each include a zig-zag configuration (a.k.a., an S-shaped configuration). The zig-zag configuration is designed to increase the density of the cables that can be stacked in the cutouts 122. For example, in the depicted embodiment, the zig-zag configuration allows a cutout 122 to accommodate four fiber optic cables stacked on top of each other, whereas straight slots would require a wider footprint for the cable manager or deeper cutouts. In other embodiments, depending upon the density required, the cutouts could have straight slotted configurations.

The angles forming the zig-zag configuration of the cutouts 122 are designed such that, while providing a higher density for the cables, they also preserve bend radius properties of the fibers. When the cable managers 106 are aligned with the boots 34 and the cutouts 122 are aligned with the crimp holding slots 60, the amount the fibers have to be bent when cables are inserted into the cutouts 122 are less than the maximum allowable bend limits for the fibers.

Figure 12:
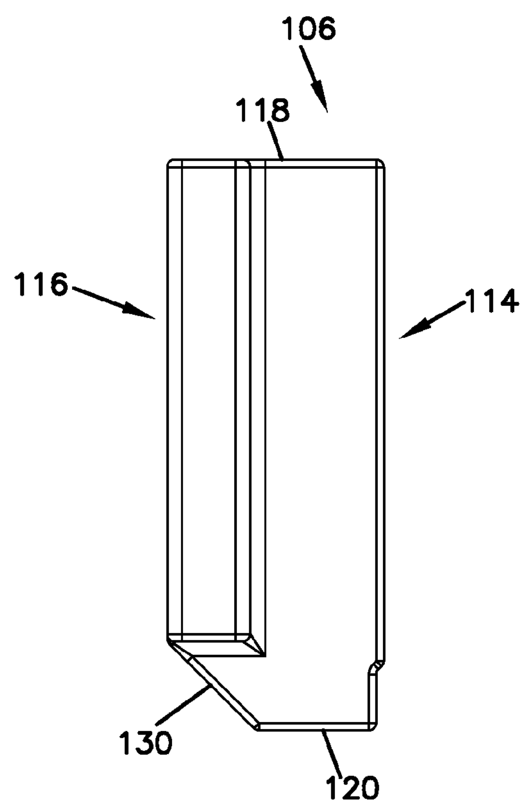
FIG. 12 is a top plan view of the insect-infestation prevention device of FIG. 6.
Figure 12A:
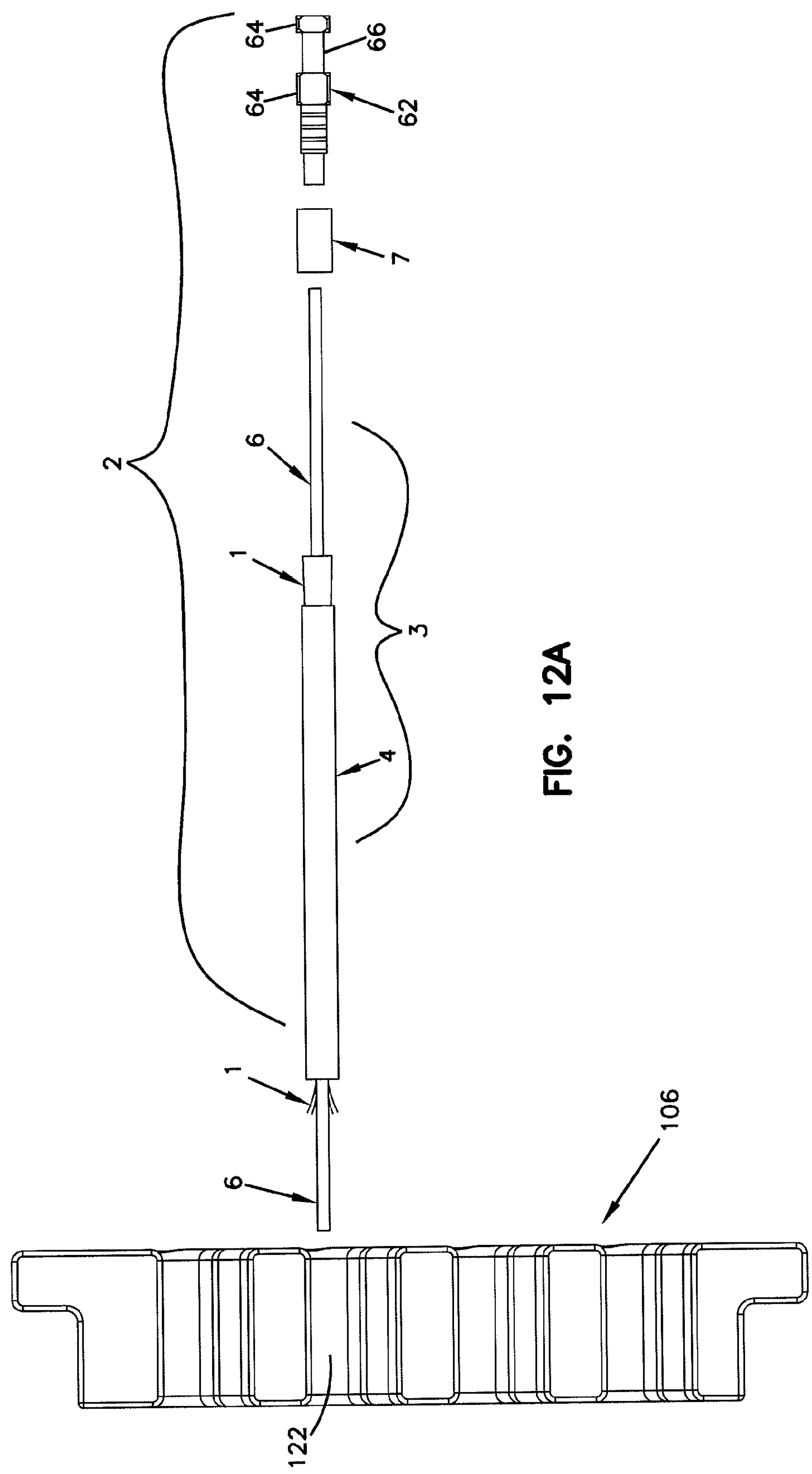
FIG. 12A illustrates an exploded view of a plug insert in the form of a dummy fiber furcation tube assembly in combination with the insect-infestation prevention device of FIG. 6.

According to one example embodiment, the insect-infestation prevention device 106 is configured to house sixteen 2 mm output fibers passing through the body 108. The cutouts 122 are preferably sized to provide a snug fit with the output cables such that any extra room around the cables is limited to prevent insect-infestation. When less then all of the cutouts 122 or less than the entirety of a cutout 122 is used, the remaining space can be plugged using different types of inserts. For example, according to one embodiment, the remaining space that is not used for outputting a fiber can be plugged using a dummy fiber furcation tube assembly 2. The dummy fiber furcation tube assembly 2 may include all of the components of a normal live fiber furcation tube assembly except for the fiber itself. An example of a dummy fiber furcation tube assembly 2 is shown in FIG. 12A. The dummy fiber furcation tube assembly 2 is shown in an exploded configuration, in combination with the insect-infestation prevention device 106. As shown, the dummy fiber tube furcation tube assembly 2 includes a crimp element 62 that is configured to be inserted into crimp holders 58, defined by slots 60 of the module housing (as shown in FIG. 1). A dummy cable 3 that includes an outer cable jacket 4, a reinforcement layer 1 (e.g., a kevlar layer), and an inner buffer tube 6 (e.g., a 900 Micron buffer tubing) may be crimped to the crimp element 62 with a crimp sleeve 7 to form the dummy fiber furcation tube assembly 2. Instead of including a live fiber therewithin, the buffer tubing 6 is provided empty and may be sealed at both ends with an adhesive (e.g., Loctite®) to form the plug. Once the dummy fiber furcation tube assembly 2 is formed, one end of the dummy assembly 2 is placed at the crimp holders 58, while the other end, after extending through a cutout 122 of the device 106, ends up extending at least partially into the boot 34 of the module, both ends of the dummy furcation tube assembly 2 sealed to prevent insect-infestation. As discussed above, the crimp elements 62 define square flanges 64 between which is defined a recessed portion 66. The slots 60 defined by the crimp holders 58 of the module include complementary structure to the crimp elements 62 such that once the crimp elements 62 are slidably inserted into the slots 60, the crimp elements 62 are prevented from moving in a longitudinal direction due to the flanges 64.

Even though a plug insert in the form of a dummy fiber furcation tube assembly 2 has been shown and described with respect to the insect-prevention device 106, a dummy fiber furcation tube assembly 2 may be used as a plug insert for all of the other embodiments of the insect-prevention devices described and shown in the present application.

Referring back to FIGS. 6-12, the rear end 116 of the body 108 includes top and bottom flanges 124, 126. As shown in FIG. 2, the insect-infestation prevention devices 106 are slidably mounted to the front cable exit openings 32, behind the boots 34, such that the top and bottom flanges 124, 126 contact the front wall 24 of the main housing 102. Once the flanges 124, 126 contact the front wall 24, the front end 114 of the insect-infestation prevention device 106 lies flush with the rear end 33 of the boot 34.

Adjacent the left side 120 of the body 108, at the rear end 116 of the body 108, is defined a chamfer 130 forming a beveled edge. The chamfer 130 is configured to accommodate cables 14 extending along the first transverse sidewall 16 of the main housing portion 102 of the module housing 100 that extend in the direction between the top wall 18 and the bottom wall 20, adjacent the cable exit openings 32. Please see FIG. 1 for an example cable 14.

According to one example method of assembling the fiber optic splitter module 90, the split signal cables 14 coming from the crimp holders 58 are inserted through the boots 34 while the boots 34 are not yet mounted on the main housing portion 102. Each of the cables 14 that has been routed through the boots 34 is inserted into the cutouts 122 of the insect-infestation prevention cable manager device 106 in a direction from the right side 118 toward the left side 120. Once the cables 14 are stacked in a zig-zag configuration, the insect-infestation prevention device 106 is slidably inserted into the exit opening 32 formed in the front wall 24 until the flanges 124, 126 contact the front wall 24. Once the insect-infestation prevention devices 106 are in place, the boots 34 can be pulled toward the module 90 and the protruding rear lips 38 of the boots 34 can be inserted into the slots 40 defined around the exit openings 32 on the front wall 24.

Once the insect-infestation prevention devices 106 and the boots 34 are placed on the main housing portion 102, the cover 104 is used to capture these components against the main housing portion 102. The cover 104 including features having inventive aspects in accordance with the present disclosure is shown in FIGS. 13-18.

Figure 13:
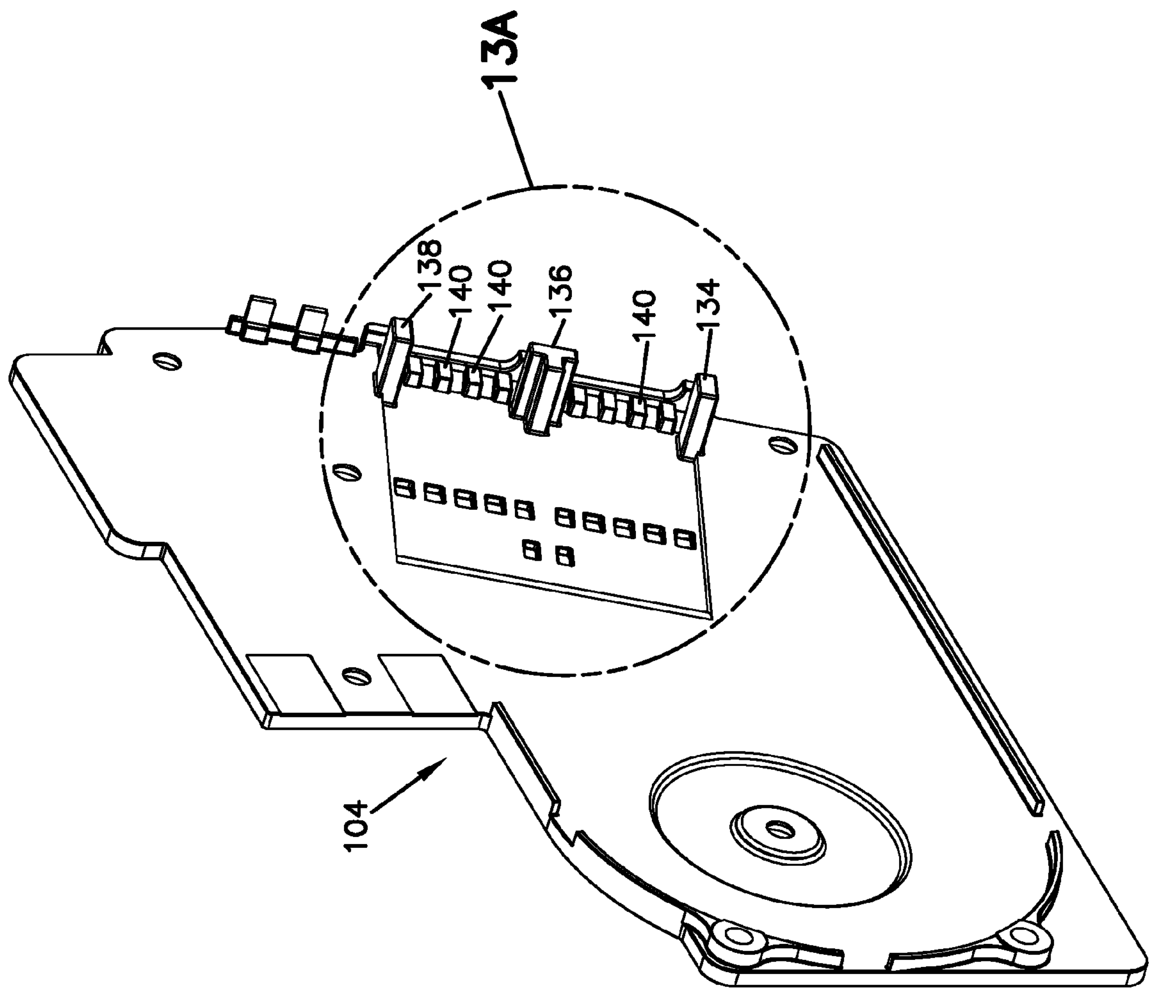
FIG. 13 is a rear, left perspective view of the cover of the fiber optic splitter module housing of FIG. 2.

Referring to FIG. 13, the cover 104 is configured to be mounted to main housing portion 102 by fasteners through fastener mounts 103 defined on main housing portion 102 (see FIG. 2). The cover 104 includes slits 132 that receive rear lips 38 of the boots 34 to capture the boots 34. Once slidably inserted, crimp elements 62 are also held in place by cover 104 that is mounted to splitter module main housing 102.

Figure 5:
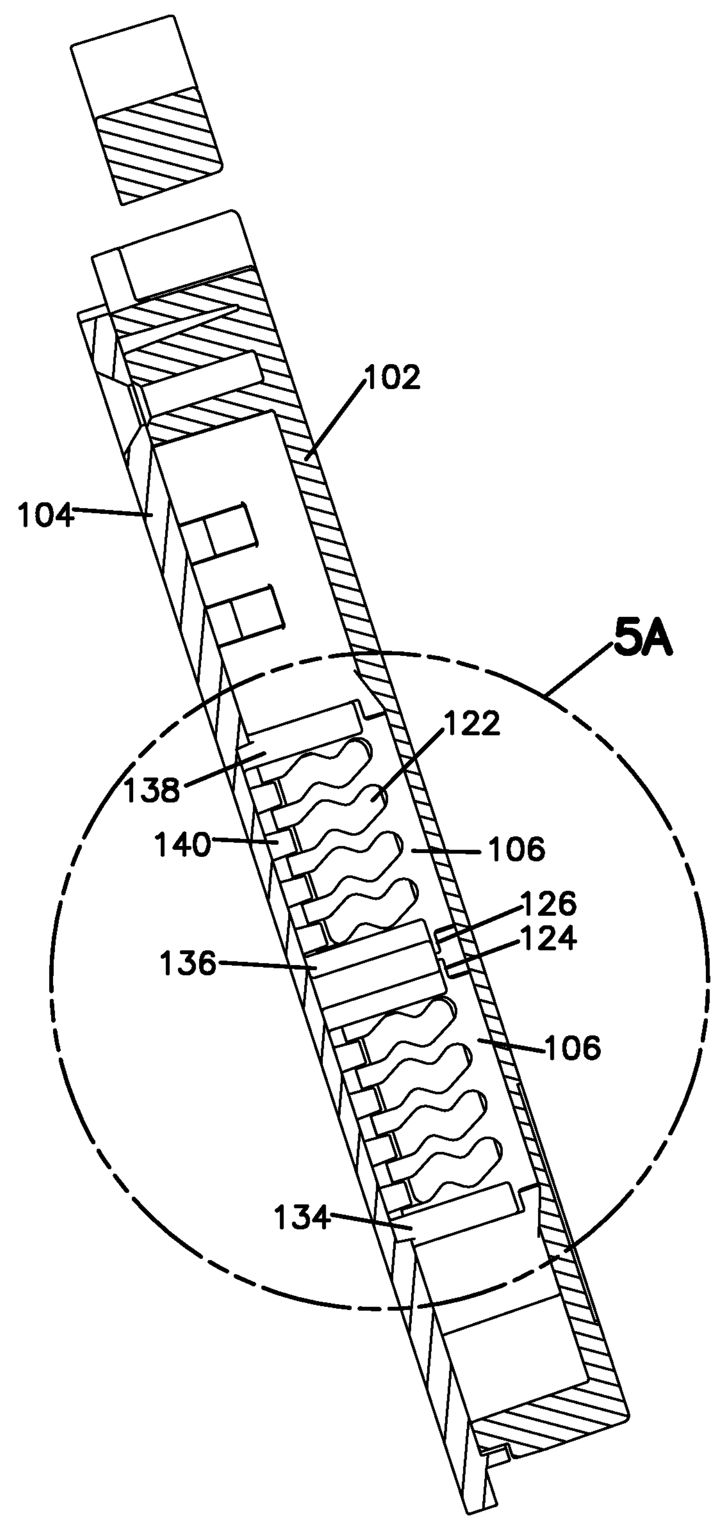
FIG. 5 is a cross-sectional view taken along lines 5-5 of FIG. 4.
Figure 5A:
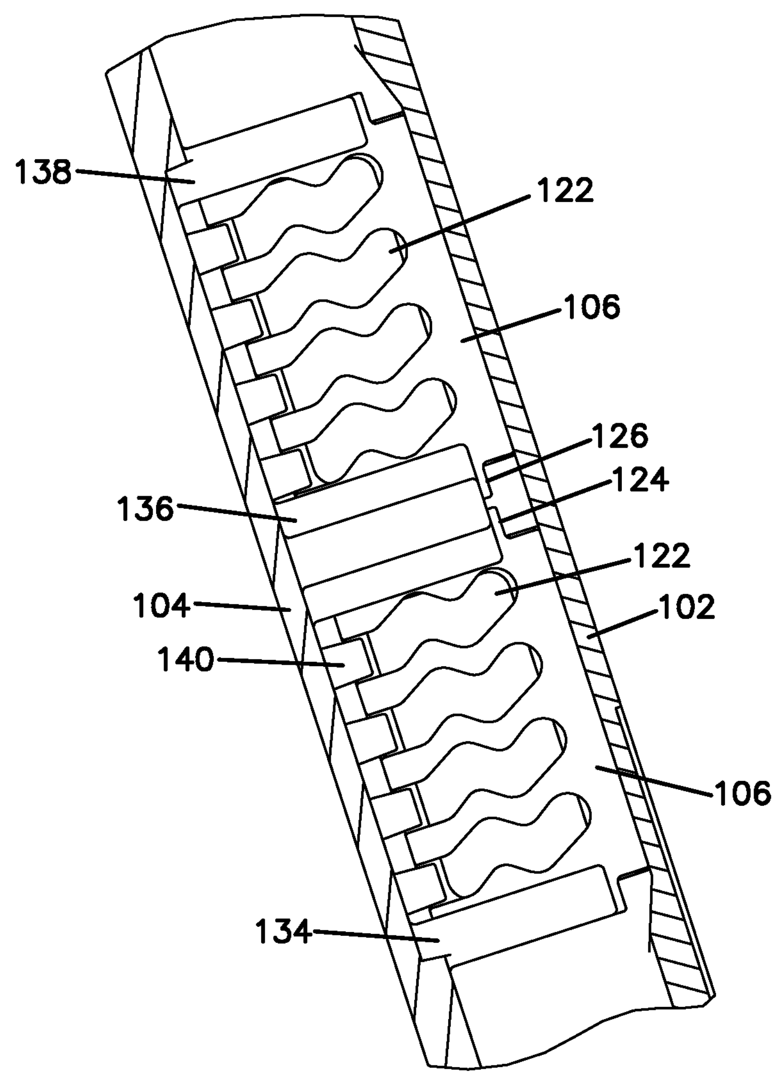
FIG. 5A is a close-up view of a portion 5A taken from FIG. 5.
Figure 6:
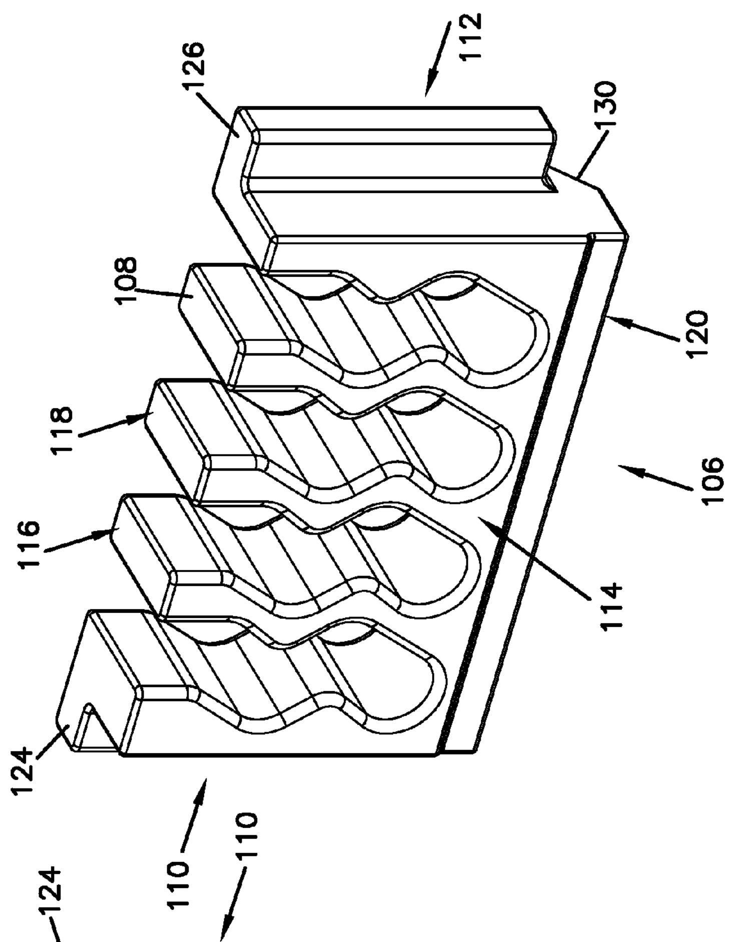
FIG. 6 is a front perspective view of an embodiment of an insect-infestation prevention device including features having examples of inventive aspects in accordance with the present disclosure.
Figure 7:
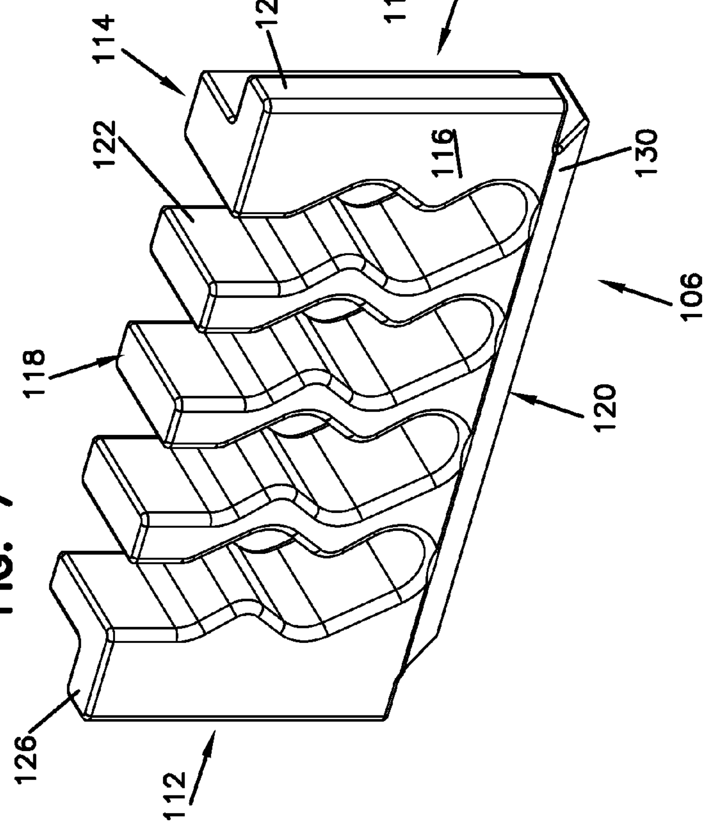
FIG. 7 is a rear perspective view of the insect-infestation prevention device of FIG. 6.
Figure 8:
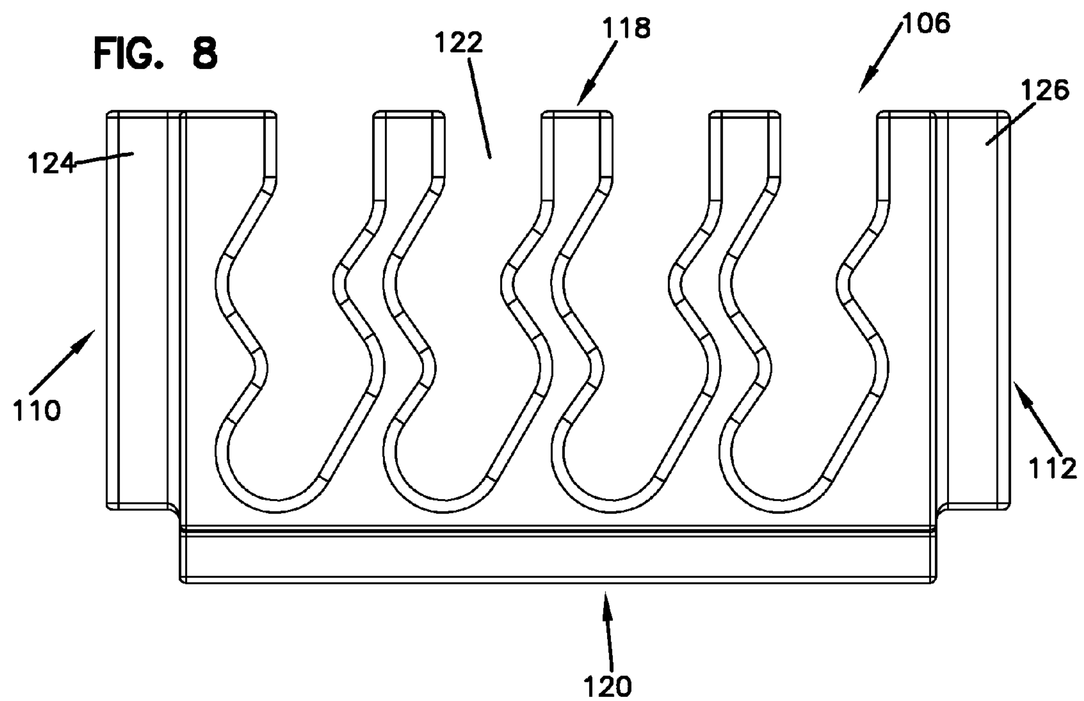
FIG. 8 is a front elevational view of the insect-infestation prevention device of FIG. 6.
Figure 9:
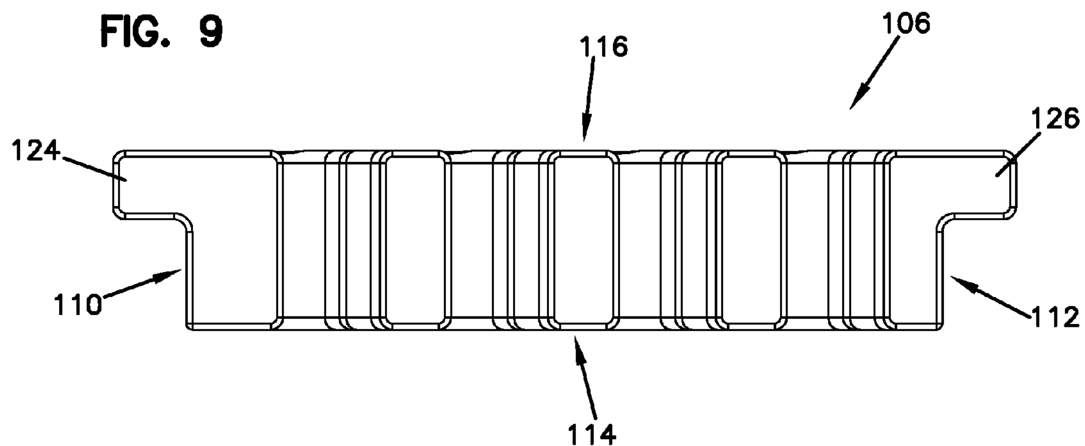
FIG. 9 is a right side elevational view of the insect-infestation prevention device of FIG. 6.
Figure 10:
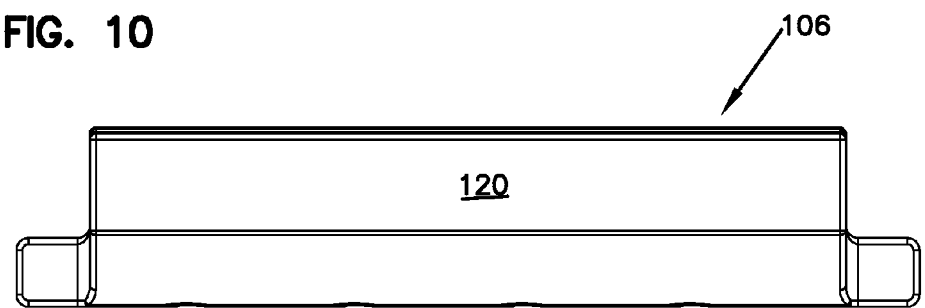
FIG. 10 is a left side elevational view of the insect-infestation prevention device of FIG. 6.
Figure 11:
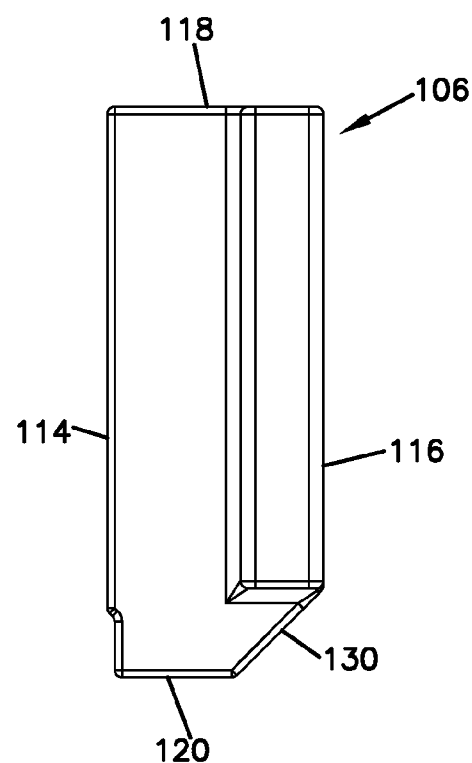
FIG. 11 is bottom plan view of the insect-infestation prevention device of FIG. 6.
Figure 13A:
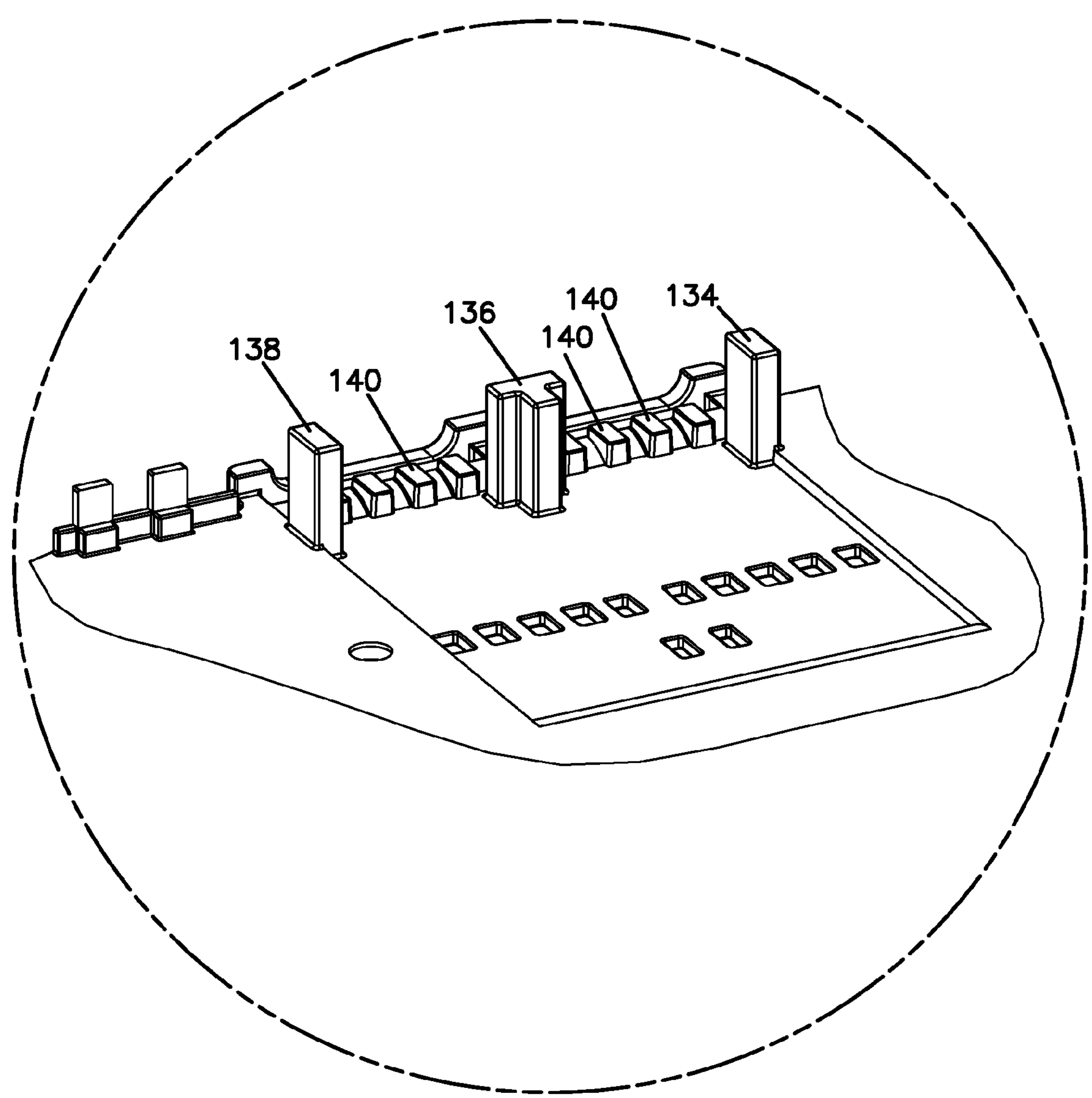
FIG. 13A is a close-up view of a portion 13A taken from FIG. 13.
Figure 18:
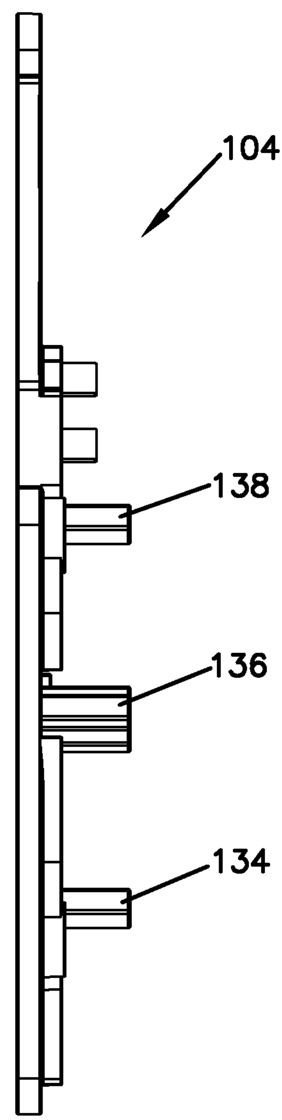
FIG. 18 is a rear elevational view of the cover of FIG. 13.
Figure 17:
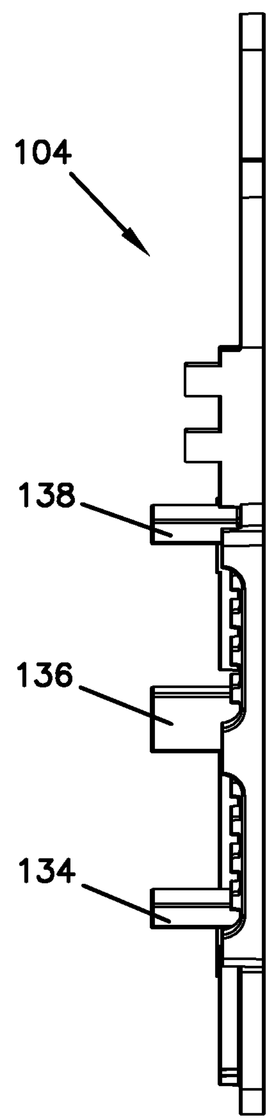
FIG. 17 is a front elevational view of the of the cover of FIG. 13.
Figure 19:
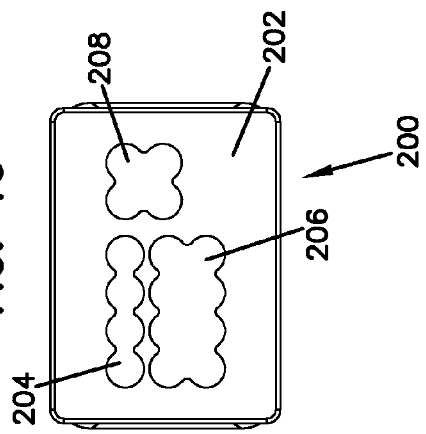
FIG. 19 is a rear view of another embodiment of an insect-infestation prevention device including features having examples of inventive aspects in accordance with the present disclosure.
Figure 22:
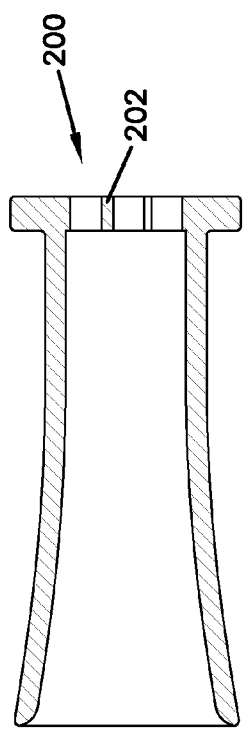
FIG. 22 is a cross-sectional view taken along line 22-22 of FIG. 20.
Figure 21:
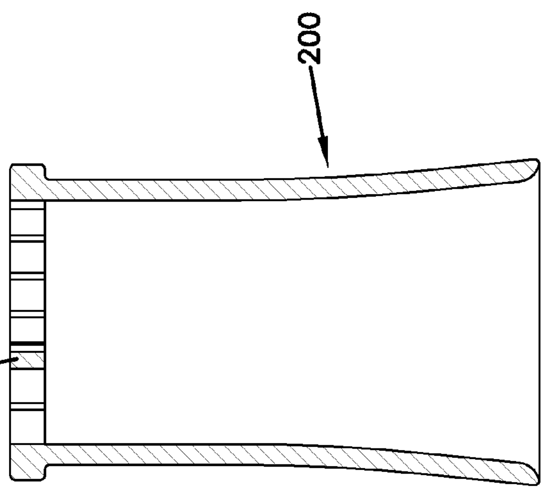
FIG. 21 is a cross-sectional view taken along line 21-21 of FIG. 20.
Figure 20:
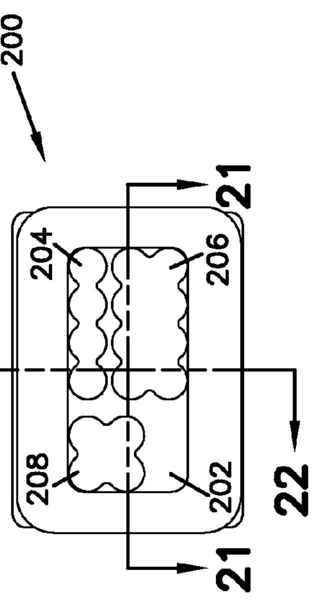
FIG. 20 is a front view of the insect-infestation prevention device of FIG. 19.

The cover 104, furthermore, includes structure for capturing the insect-infestation prevention devices 106 with respect to the main housing portion 102. As shown in FIGS. 13 and 13A, the cover 104 includes standoffs 134, 136, 138 (i.e., legs) extending from the cover 104 toward the module main housing portion 102. The front faces of the standoffs 134, 136, 138 are configured to abut the rear end 116 of the insect-infestation prevention devices 106 for fixing the insect-infestation prevention devices 106 in a front to back direction. In the depicted embodiment, the center standoff 136 includes a front face that is twice as wide as the other standoffs 134, 138 since the center standoff 136 is configured to abut two cable managers 106 mounted adjacent to each other. The center standoff 136 abuts the bottom flange 126 of one insect-infestation prevention device 106 and the top flange 124 of an adjacently placed insect-infestation prevention device 106 as shown in FIGS. 5 and 5A.

Between the standoffs 134, 136, 138, the cover 104 includes protrusions 140 that are configured to align with the cutouts 122 of the insect-infestation prevention devices 106 and push on the cables 14 within the cutouts 122. The protrusions 140 facilitate keeping the fiber cables organized within the cutouts 122 and also limit the amount of room available around the cables 14.

Referring now to FIGS. 19-36, five different embodiments of insect-infestation prevention devices that are formed as part of the bend limiting boots are illustrated. In the depicted examples, the boots include, adjacent the rear ends thereof, a solid bulkhead configured to cover the central opening of the boot except for passageways for the cables. Depending upon the desired arrangements, different shaped openings are cutout of the bulkhead. The bulkheads are configured to limit the amount of free room around the cables that are inserted through the boots. The bulkheads are designed such that when the output cables are directed from the crimp holders 58 through the boots, any remaining space around the cables are limited by the bulkheads. The boots shown in FIGS. 19-36 are shaped so as to still be usable with the main housing portions of the splitter modules shown in FIGS. 1 and 2.

The first example embodiment of a boot 200 including insect-infestation prevention features is shown in FIGS. 19-22. The boot 200 includes, cut out of a bulkhead 202, a first opening 204 designed to accommodate four cables in a side by side configuration, a second opening 206 designed to accommodate two layers of four cables in a side by side configuration, and a third opening 208 designed to accommodate two layers of two cables in a side by side configuration. It should be noted that in certain examples such as the one shown in FIGS. 19-22, rather than having one large opening, there are several openings 204, 206, 208 provided in a certain configuration. The openings 204, 206, 208 of the boot 200 are provided separately for providing variability for the types of splitters (1×16, 1×4, 1×32, etc.) that can be used within the module. In this manner, for example, if a splitter smaller than a 1×32 is used, only one or two of the openings are used and the unused opening may be plugged by an insert (e.g., a dummy fiber furcation tube assembly). Separating out the openings allows an unused opening to be completely sealed by a form-fitting insert rather than having to partially cover a larger opening.

Figure 25:
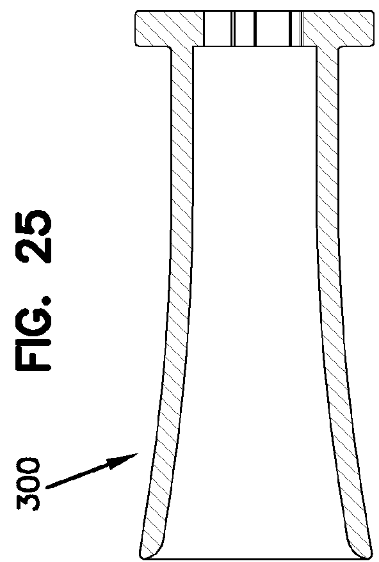
FIG. 25 is a cross-sectional view taken along line 25-25 of FIG. 23.
Figure 24:
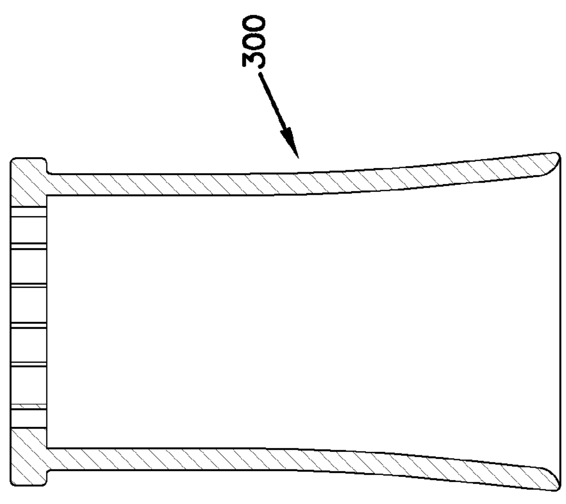
FIG. 24 is a cross-sectional view taken along line 24-24 of FIG. 23.
Figure 23:
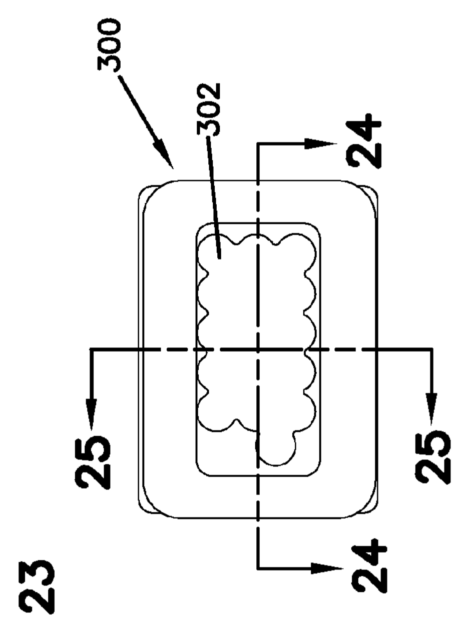
FIG. 23 is a front view of another embodiment of an insect-infestation prevention device including features having examples of inventive aspects in accordance with the present disclosure.

However, as will be noted, a boot including a bulkhead and one large opening cut out in the bulkhead may still be used depending upon the desired need. FIGS. 23-25 illustrate an embodiment of a boot 300 having one large opening 302 designed to accommodate sixteen cables while preserving the thin profile of the boot 300.

Figures 26, 27, 28:
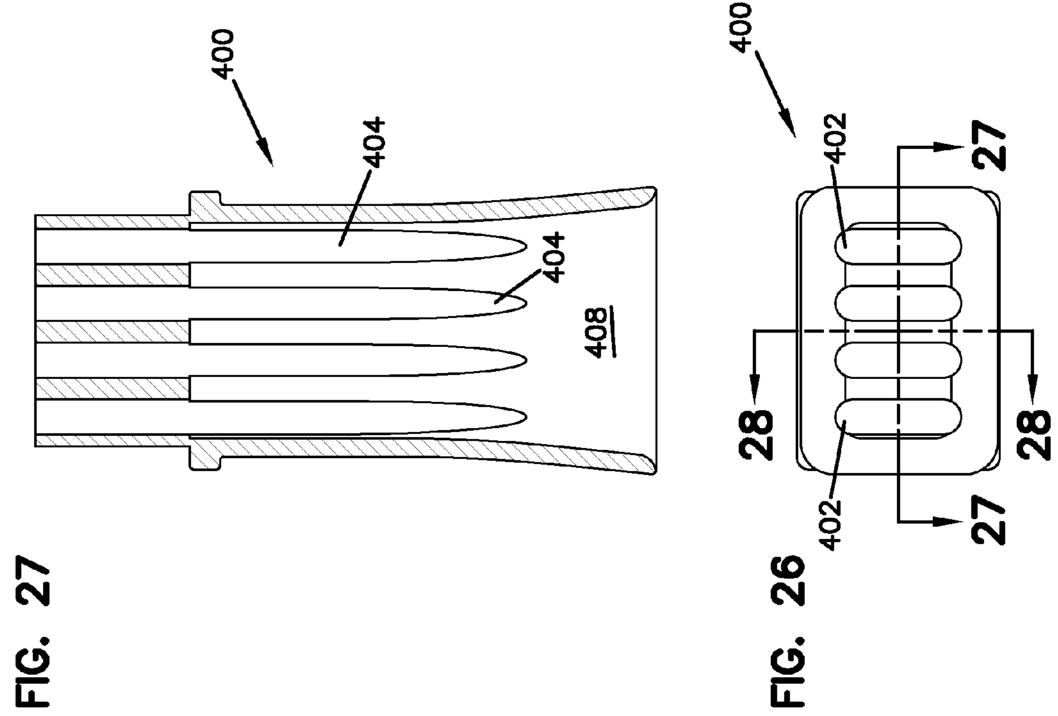
FIG. 26 is a front view of another embodiment of an insect-infestation prevention device including features having examples of inventive aspects in accordance with the present disclosure.
FIG. 27 is a cross-sectional view taken along line 27-27 of FIG. 26.
FIG. 28 is a cross-sectional view taken along line 28-28 of FIG. 26.
Figure 29:
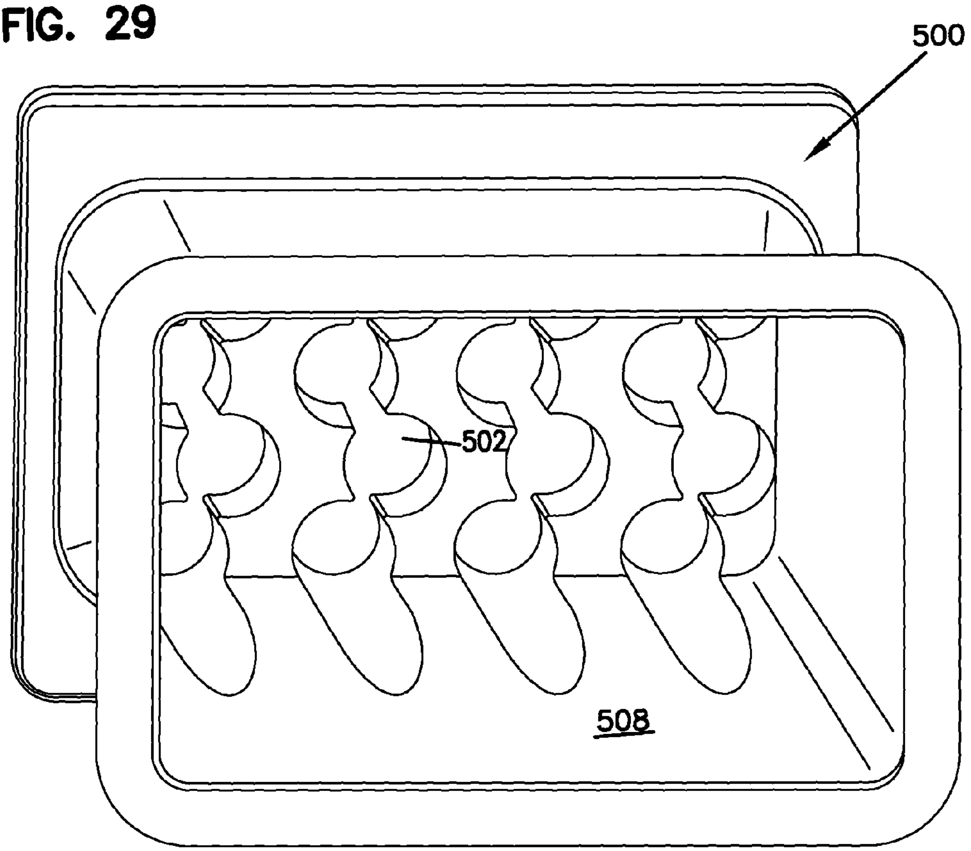
FIG. 29 is a front perspective view of another embodiment of an insect-infestation prevention device including features having examples of inventive aspects in accordance with the present disclosure.
Figure 30:
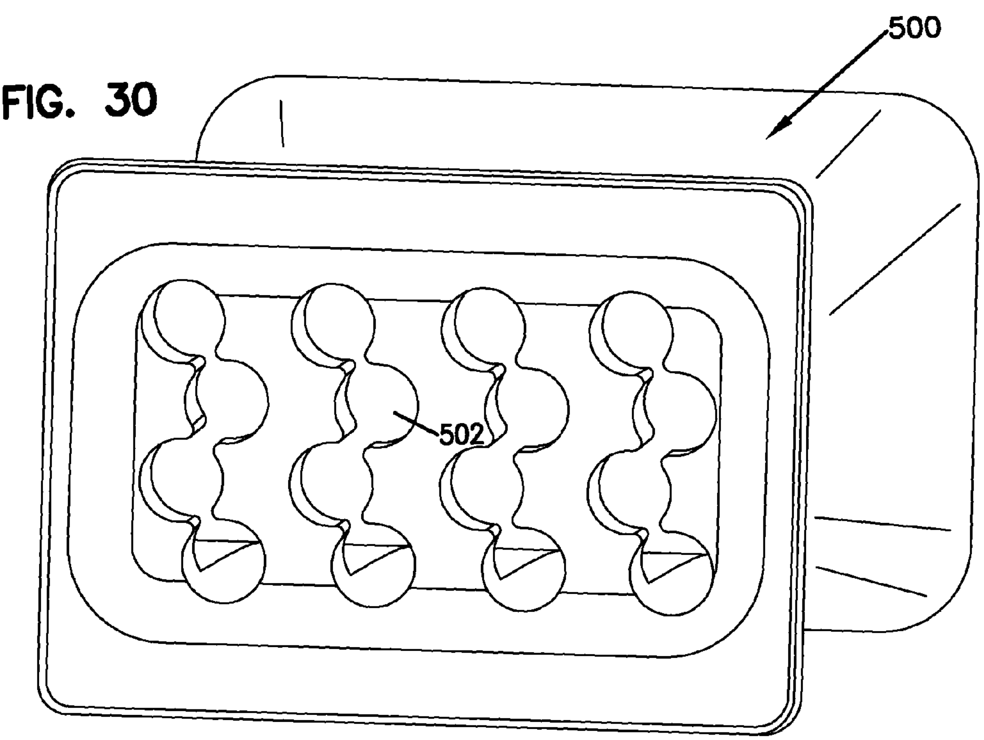
FIG. 30 is a rear perspective view of the insect-infestation prevention device of FIG. 29.
Figure 33:
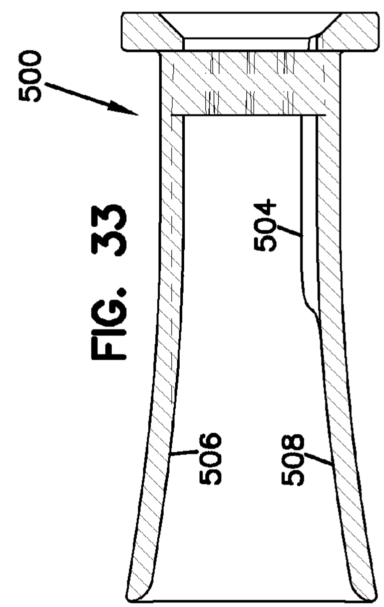
FIG. 33 is a cross-sectional view taken along line 33-33 of FIG. 31.
Figure 32:
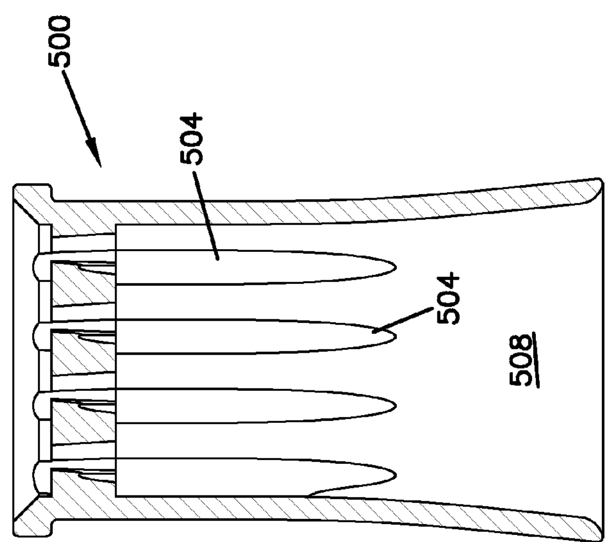
FIG. 32 is a cross-sectional view taken along line 32-32 of FIG. 31.
Figure 31:
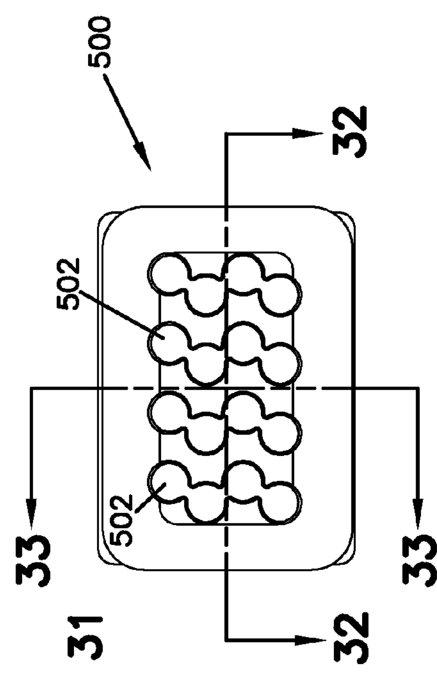
FIG. 31 is a front view of the insect-infestation prevention device of FIG. 29.

FIGS. 26-28 illustrate an embodiment of a boot 400 having four adjacent straight slits 402, each accommodating four cables, for a total density of sixteen cables per boot. The slits 402 also define grooves 404 running partially along the boot body in a longitudinal direction at the inner right and left walls 406, 408, respectively, of the boot 400.

FIG. 29-33 illustrate an embodiment of a boot 500 including openings 502 similar to the cutouts 122 provided in the insect-infestation prevention device formed as cable managers 106, having zig-zag configurations. As described above, the zig-zag configuration allows the density of the cables to be increased within a given profile. The boot 500 illustrated in FIGS. 29-33 also includes grooves 504 running partially along the boot body in a longitudinal direction at the inner right and left walls 506, 508, respectively, of the boot.

Figures 34, 35, 36:
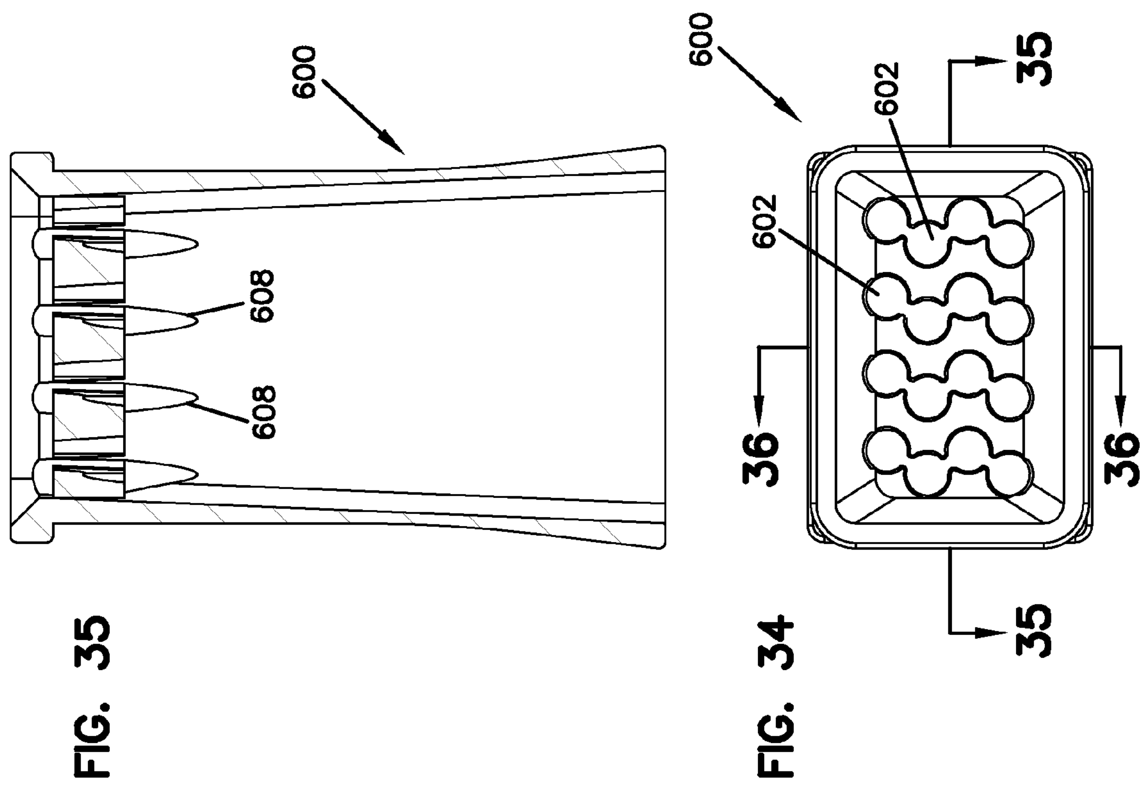
FIG. 34 is a front view of another embodiment of an insect-infestation prevention device including features having examples of inventive aspects in accordance with the present disclosure.
FIG. 35 is a cross-sectional view taken along line 35-35 of FIG. 34.
FIG. 36 is a cross-sectional view taken along line 36-36 of FIG. 34.

FIG. 34-36 illustrate another embodiment of a boot 600 including openings 602 having a zig-zag configuration. The boot 600 includes a slightly different configuration from that of FIGS. 29-33 such as thicker right and left walls 604, 606, respectively, and shorter grooves 608 running partially along the boot body.

Although in the foregoing description, terms such as "top", "bottom", "upper", "lower", "front", "back", "rear", "right", and "left" were used for ease of description and illustration, no restriction is intended by such use of the terms.

The above specification, examples and data provide a complete description of the manufacture and use of the disclosure. Since many embodiments of the disclosure can be made without departing from the spirit and scope of the inventive aspects, some of the inventive aspects reside in the claims hereinafter appended.

What is claimed is:

1. A fiber optic telecommunications module, comprising:

a housing including a main housing portion defining a first transverse wall, a front wall, a rear wall, a top wall, and a bottom wall, cooperatively defining an interior;

a cable exit/entry opening on one of the front wall, the rear wall, the top wall, and the bottom wall;

a bend limiting boot extending from the front wall of the housing, the bend limiting boot defining a boot opening aligned with the cable exit/entry opening for routing cables in/out of the housing;

a removable insect-infestation prevention device located adjacent the cable exit/entry opening and mounted adjacent the bend limiting boot, the insect-infestation prevention device slidably inserted into the cable exit/entry opening in a direction generally along the central axis of the cable exit/entry opening, the insect-infestation prevention device including partial cut-outs having open sides for receiving the cables in a direction perpendicular to the central axis of the cable exit/entry opening, the partial cut-outs also defining cable openings that are along the central axis of the cable exit/entry opening and communicating with the cable exit/entry opening, the cable openings sized to accommodate fiber optic cables exiting or entering the housing while limiting the amount of free space around the fiber optic cables to prevent insects from entering the housing; and a removable cover mounted to the main housing portion to define a second transverse wall of the housing, the removable cover capturing the insect-infestation prevention device against the main housing portion, when mounted, the removable cover configured to sealably close the open sides of the partial cut-outs of the insect-infestation prevention device and also including a stand-off configured to abut a rear end of the insect-infestation prevention device to fix the insect-infestation device in a front to back direction.

2. A fiber optic telecommunications module according to claim 1, wherein the partial cutouts include a zig-zag configuration for increasing the density of cables that can be stacked within the cutouts in a direction extending from the second transverse wall toward the first transverse wall.

3. A fiber optic telecommunications module according to claim 1, wherein the bend limiting boot defines a protruding rear lip that is slidably inserted into a slot defined around the cable exit/entry opening, wherein the cover includes at least one slit for capturing the rear lip of the bend limiting boot.

4. A fiber optic telecommunications module according to claim 1, wherein the housing includes a fiber optic splitter within the interior.

5. A fiber optic telecommunications module according to claim 1, wherein a cable opening of the insect-infestation prevention device is plugged by an insert that does not include an optical fiber.

6. A fiber optic telecommunications module according to claim 5, wherein the insert includes a dummy fiber furcation tube assembly including a dummy cable having an outer cable jacket, a reinforcement layer, and an inner tube crimped to a crimp element, wherein both ends of the inner tube are sealed with an adhesive.

7. A fiber optic telecommunications module according to claim 1, wherein the insect-infestation prevention device includes four partial cutouts accommodating four stacked cables each.

* * * * *